(12) United States Patent
Johnson et al.

(10) Patent No.: US 6,378,300 B1
(45) Date of Patent: Apr. 30, 2002

(54) NEUTRAL START SWITCH AND ADJUSTMENT ASSEMBLY FOR A HYDROSTATIC TRANSMISSION

(75) Inventors: Kevin J. Johnson, Salem; Richard T. Ruebusch, New Albany, both of IN (US)

(73) Assignee: Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 09/671,796

(22) Filed: Sep. 27, 2000

Related U.S. Application Data

(63) Continuation-in-part of application No. 09/498,692, filed on Feb. 7, 2000
(60) Provisional application No. 60/119,381, filed on Feb. 9, 1999, and provisional application No. 60/145,619, filed on Jul. 26, 1999.

(51) Int. Cl.[7] .......................... F16D 31/02; F16D 39/00
(52) U.S. Cl. ........................................ 60/399; 60/487
(58) Field of Search .......................... 60/328, 487, 399

(56) References Cited

U.S. PATENT DOCUMENTS

| | | | |
|---|---|---|---|
| 2,406,138 A | 8/1946 | Ferris et al. | 103/161 |
| 2,673,526 A | 3/1954 | Horton | 103/161 |
| 3,528,311 A | 9/1970 | Fieber | 74/481 |
| 4,516,439 A | 5/1985 | Sagaser | 74/470 |
| 4,531,365 A | 7/1985 | Wanie | 60/328 |
| 4,608,879 A | 9/1986 | Ishida et al. | 74/474 |
| 4,934,252 A | 6/1990 | Giere | 91/497 |
| 4,968,227 A | 11/1990 | Szulczewski et al. | 417/440 |
| 5,142,940 A | 9/1992 | Hasegawa | 74/606 R |
| 5,234,321 A | 8/1993 | Gafvert | 417/219 |
| 5,241,872 A | 9/1993 | Betz et al. | 74/60 |
| 5,586,955 A | 12/1996 | Wanie | 477/99 |
| 5,836,159 A | 11/1998 | Shimizu et al. | 60/487 |
| 5,845,559 A | 12/1998 | Schroeder et al. | 92/12.2 |

*Primary Examiner*—Edward K. Look
*Assistant Examiner*—Michael Leslie
(74) *Attorney, Agent, or Firm*—Baker & Daniels

(57) ABSTRACT

A hydrostatic transaxle assembly is drivingly connected to a power source and the power source is activated through an electric starter circuit. The hydrostatic transaxle includes an axial type hydrostatic transmission module having a pump which includes a plurality of axially arranged cylinders each including a piston therein. A tiltable swash plate includes a lateral surface rotatable within the hydrostatic transmission casing. The swash plate is in engagement with the plurality of pistons wherein tilting of the swash plate effectuates fluid displacement of the pump. A neutral switch is fixed relative to the transmission casing and includes a registering portion engaged with the swash plate to detect a neutral position and correspondingly allow starting of an electric starter through the starter circuit. A neutral adjustment assembly includes a control rod rotatably supported by the casing and a two piece shift lever is attached thereto. The two piece lever includes a first member attached to the control rod and a second member normally releasably fixed to the first member but selectively rotatable relative to the first member when loosened from the first member. A resilient biasing member has a first leg held substantially fixed to the casing and a second leg held substantially fixed to the second member of the shift lever to bias the first member of the shift lever into a neutral position and at least one fastener releasably fixes the first and second members together.

13 Claims, 10 Drawing Sheets

FIG_1

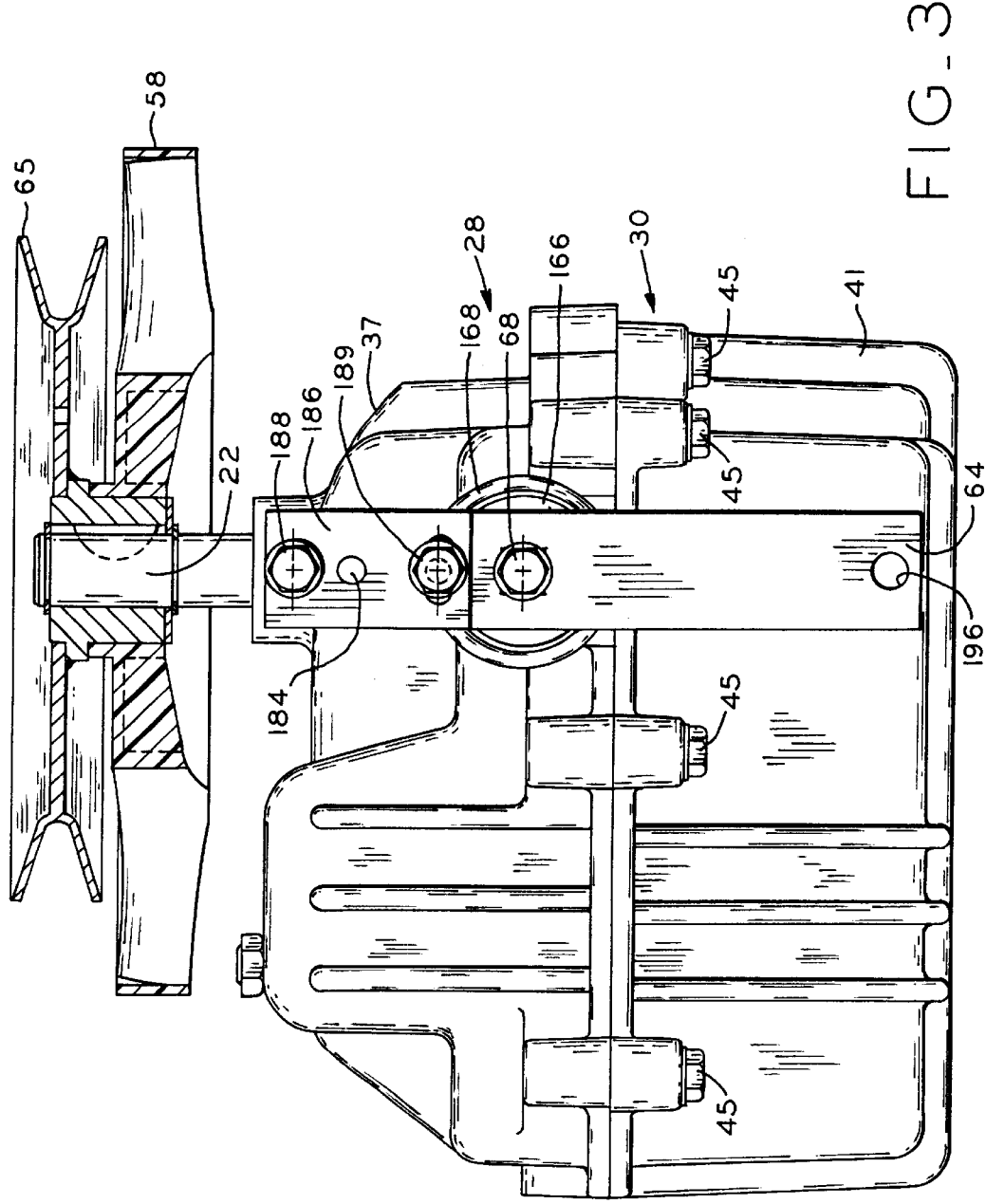

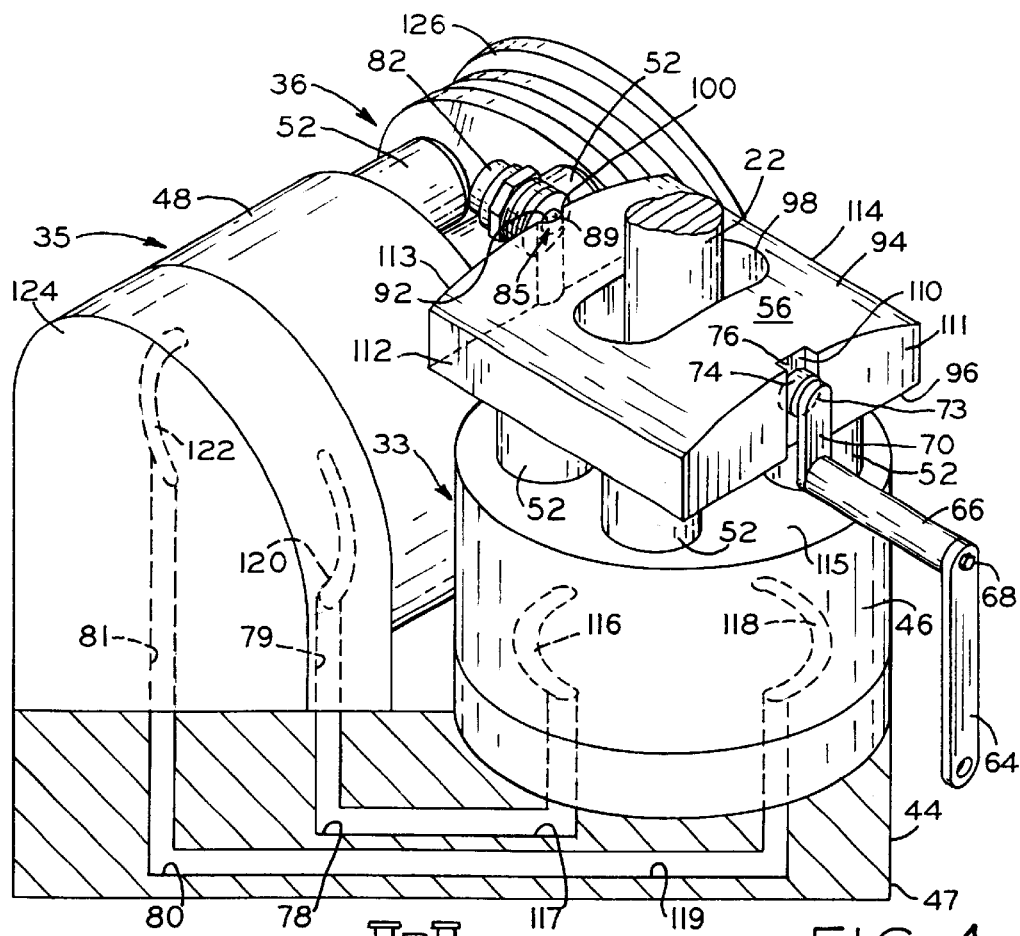
FIG_4
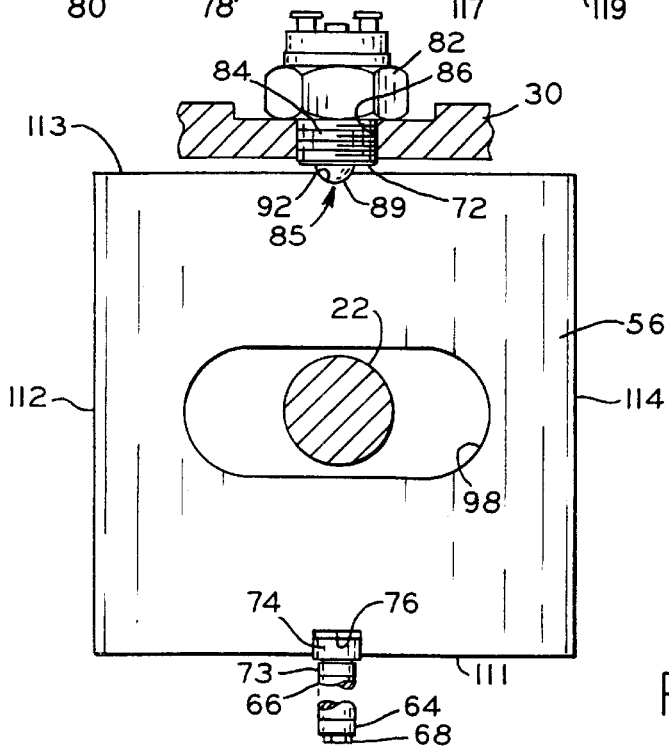
FIG_9

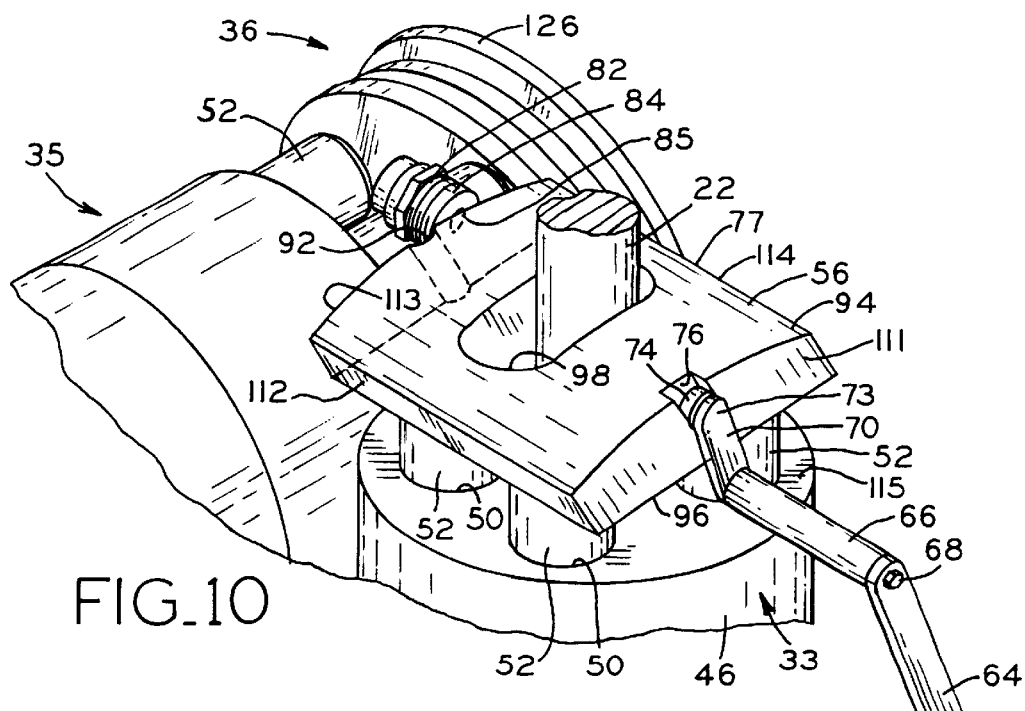
FIG_10
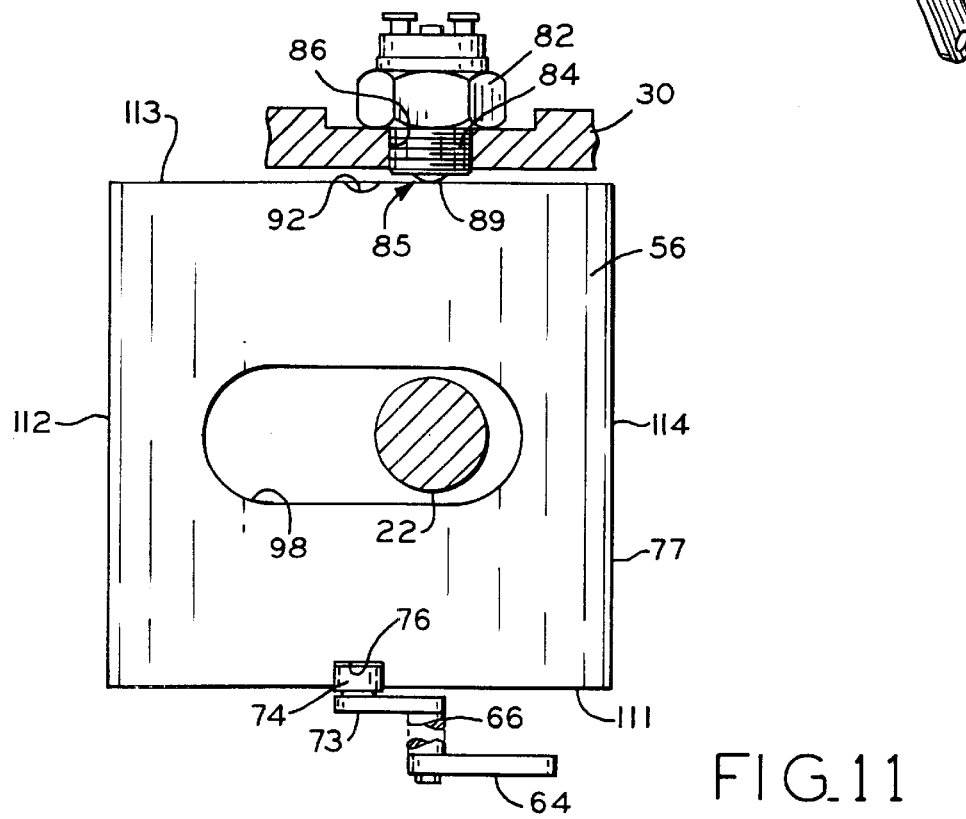
FIG_11

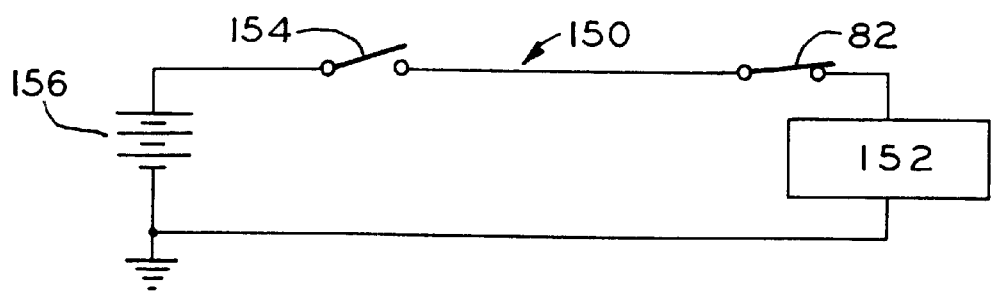
FIG_12
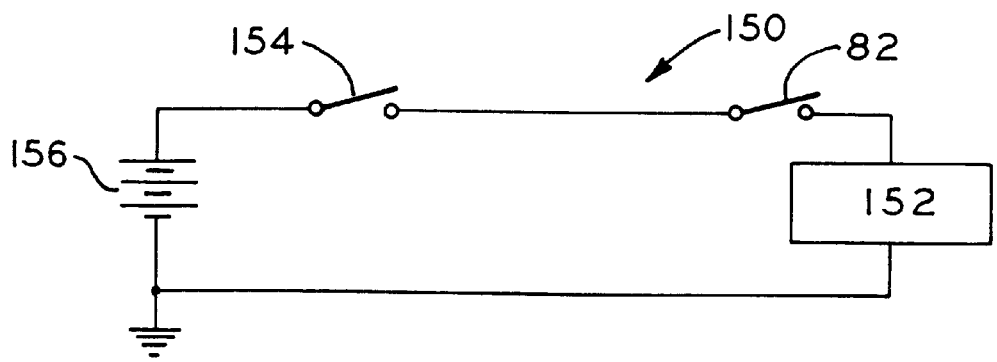
FIG_13

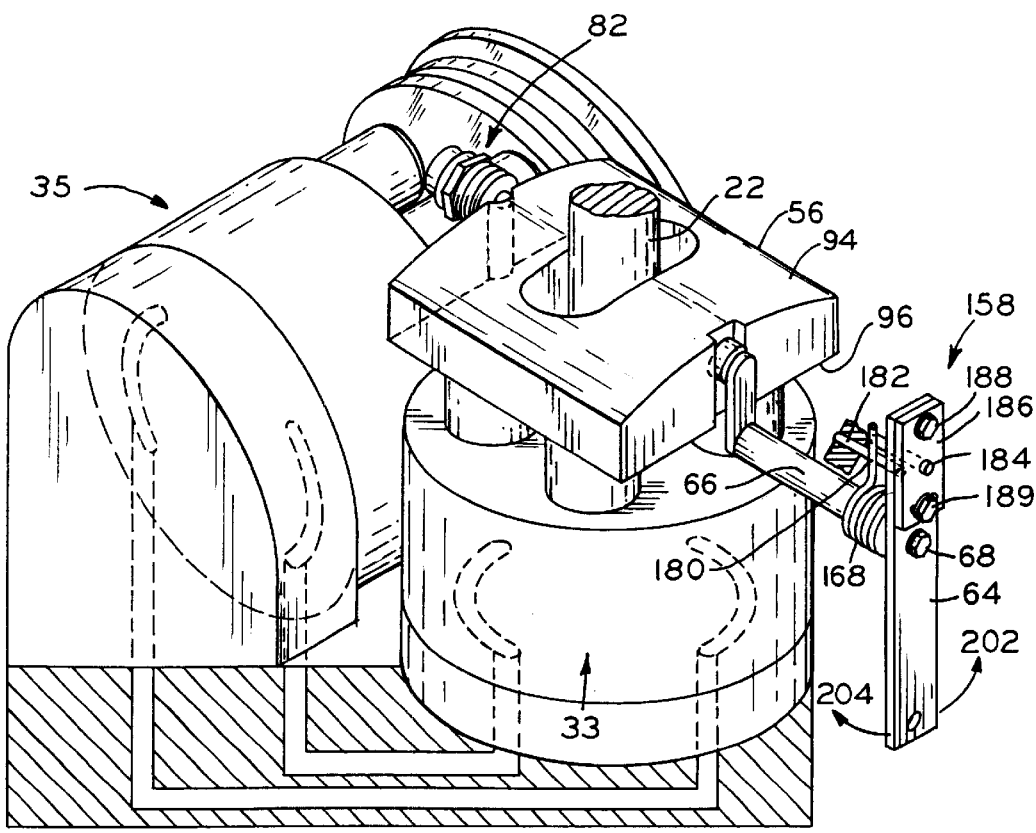
FIG_17
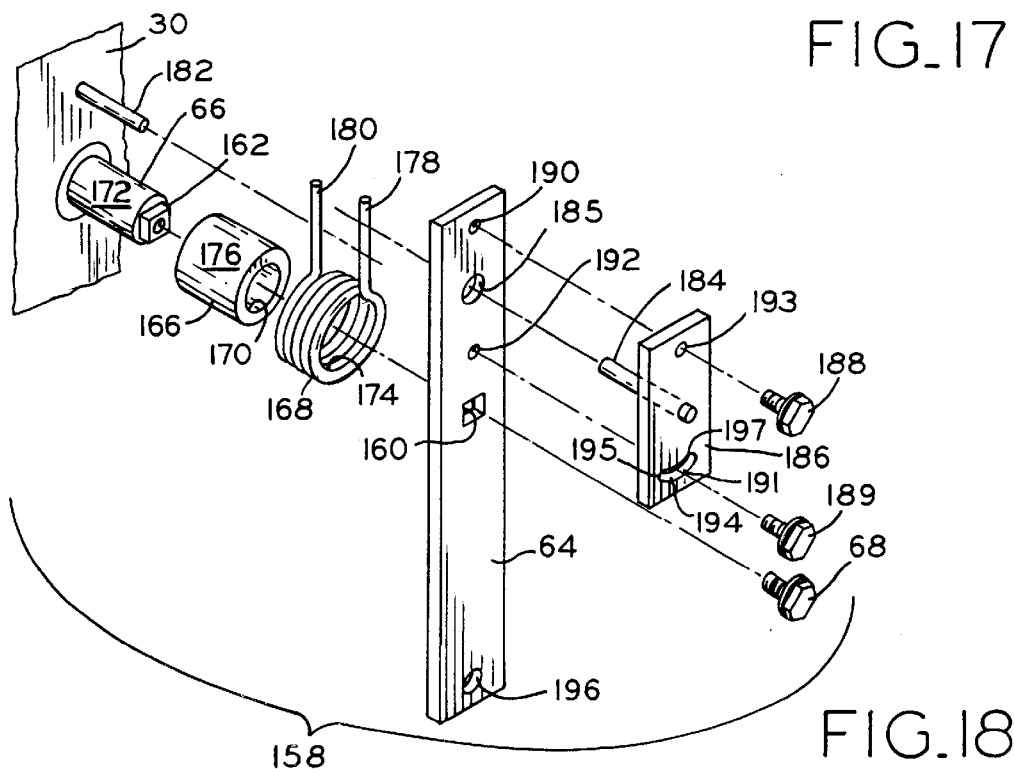
FIG_18

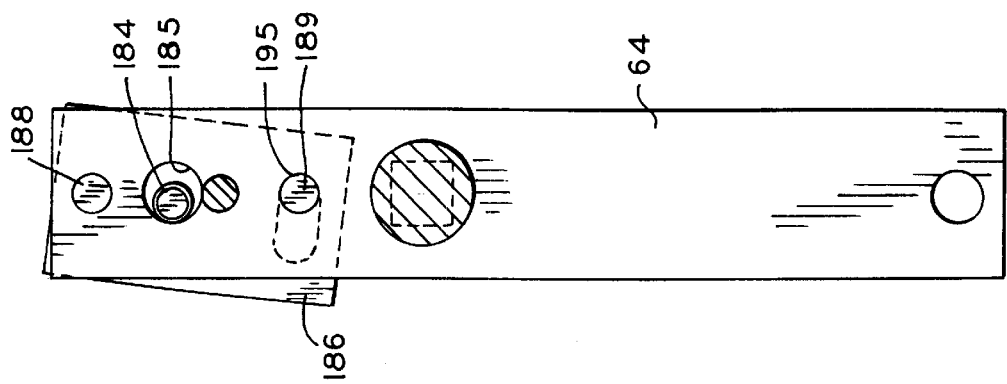
FIG._21
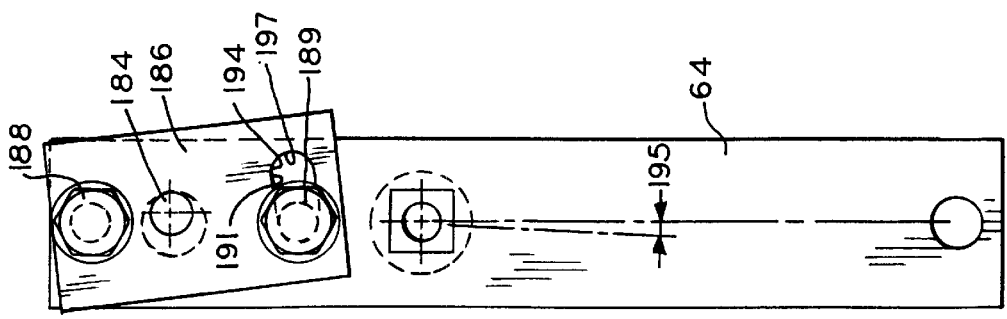
FIG._20
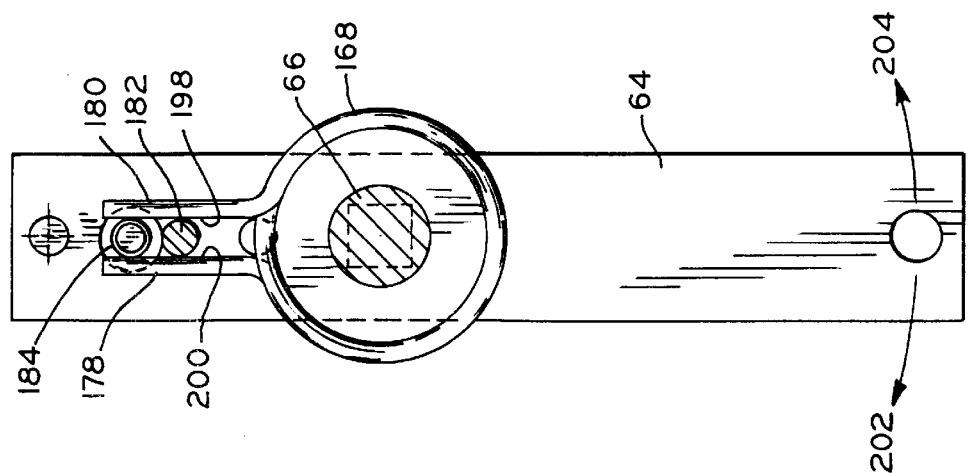
FIG._19

NEUTRAL START SWITCH AND ADJUSTMENT ASSEMBLY FOR A HYDROSTATIC TRANSMISSION

This is a Continuation-in-Part of U.S. patent application Ser. No. 09/498,692, filed Feb. 7, 2000 which claims benefit of Provisional Application 60/119,381 filed Feb. 9, 1999 and 60/145,619 filed Jul. 26, 1999.

BACKGROUND OF THE INVENTION

1. Field of the Invention

The present invention relates to hydrostatic transaxles intended primarily for use in the lawn and garden industry on riding lawnmowers, lawn and garden tractors and the like, but may also be applied to larger implements and vehicles.

2. Description of the Related Art

Hydrostatic transmissions transmit rotary mechanical motion, typically from an internal combustion engine, to fluid motion, typically oil, and then back to rotary mechanical motion to rotate a pair of drive axles in order to drive the vehicle. The hydrostatic transmission controls the output rotary mechanical motion such that varying output speeds in the forward and reverse directions are possible with a single speed input rotary mechanical motion. Such transmissions have utilized radial piston pumps and motors, axial piston pumps and motors and hybrid transmissions wherein the pump may be of the radial piston design, for example, and motor formed as a gear pump. The speed of the output of the transmission is typically controlled by varying the eccentricity of the pump track ring or swash plate.

It is well known to provide a "neutral switch" for use with many vehicle types so that an operator is prevented from starting or activating the vehicle when the vehicle's transmission is engaged. Neutral switch applications, heretofore, include neutral switch placement, specifically the motion sensing portion thereof, external to a vehicle's transmission to monitor the neutral position secondarily through linkage positioned remotely respective of the pump. Problems arise when linkage becomes loose or worn or if the switch is damaged through the normal rigors of agricultural usage. One such problem involves "creep" i.e., slight movement of the vehicle when apparently in neutral, due to loose linkage between a shift lever and the internal componentry comprising the transmission. Often, the neutral switch contacts or registers off of loose linkage which allows activation of the power source even though the transmission remains engaged, albeit slightly.

In response to difficulties encountered with neutral switch placement exterior to the transmission, the neutral switch, or the motion sensing portion thereof, was installed internally for use with radial piston-type hydrostatic transmissions. Although the benefits of the neutral switch may be appreciated with radial piston hydrostatic transmissions, axial piston hydrostatic transmissions include certain advantages over their radial counterparts. One such advantage is reduction in overall transmission size which provides for a reduction in materials corresponding to a decrease in cost. A neutral switch adaptable to an axial piston hydrostatic transmission, capable of registering a neutral position internally to the transmission would be most desirable. Another problem incident with hydrostatic transmissions, specifically neutral arrangements and adjustability assemblies therefor, is the lack of a neutral adjustment assembly, externally accessible and low in cost.

The speed of a hydrostatic transmission is generally selectively controlled by an operator via a hand control or foot pedal control, for example, by varying the eccentricity of the pump track ring or swash plate. Hydrostatic transmissions do not always provide a true 'neutral' when first assembled (i.e., transmission fluid is pressurized by the pump, albeit minimally, which can cause rotation of the axle). Manufacturers confront this problem by providing a neutral adjustment mechanism, as part of the hydrostatic transmission, which cooperates with the swash plate such that a true neutral may be exacted after assembly. Some neutral adjustment mechanisms are provided internally within the hydrostatic transmission casing. Included in the group of neutral adjustment mechanisms, customarily used, is the extendible threaded linkage shaft. The linkage shaft allows an operator fine adjustment of the swash plate by extending or collapsing, via threaded engagement, the threaded shaft to effectuate the adjustment.

The neutral adjustment offered by a threaded shaft tends to vibrate loose, and additionally, fine adjusting via a threaded shaft is often a cumbersome task since the shaft must be secured and the ends thereof extended. Internal type neutral adjustment mechanisms are also cumbersome since substantial disassembly of a vehicle is generally necessary to access the neutral adjustment device. What would be highly desirable is a neutral adjustment mechanism that is accessible subsequent to assembly of a vehicle and one which preserves a neutral setting once adjustment is finalized. Further, a neutral adjustment assembly which readily adapts to the structure of the existing neutral return assembly structure, mandating few additional parts and little if any additional machining, would be highly desirable.

SUMMARY OF THE INVENTION

The present invention overcomes the disadvantages of the prior art by providing a hydrostatic transaxle including a neutral switch, disposed within a transmission casing and registering off of the swash plate. Moreover, a neutral adjustment assembly is provided, to overcome further disadvantages plagued by the prior art, by providing a neutral adjustment assembly including an externally arranged two-piece shift lever structure facilitating neutral adjustment externally and within in proximity to the shift lever, which is particularly useful in foot pedal control applications.

The hydrostatic transaxle of the present invention is drivingly connected to a power source which is electrically activated through an ignition circuit and a variable displacement pump is fixed relative to the casing and driven by the power source. The pump includes a pump cylinder barrel which includes a plurality of parallel arranged axially reciprocable pistons. A swash plate is positioned between the pistons and the casing and includes a lateral surface rotatably engaged within a recess defined by the casing. Each piston is engaged with the swash plate whereby tilting of the swash plate effectuates a fluid displacement in the pump. A neutral switch includes a portion fixed to the casing and a registering portion internally positioned within the casing. The registering portion of the switch is positioned against the swash plate itself whereby pump displacement electrically deactivates the ignition circuit.

The present invention further provides a neutral adjustment assembly for use with a hydrostatic transmission including a casing enclosing the hydrostatic transmission and a control rod rotatably supported by said casing and including a portion positioned externally relative to said casing. A two member shift lever is provided which includes a first member attached to the externally positioned portion of the control rod and a second member adjustably fixed relative to the first member. A resilient member, having a first end held to the casing and a second end held to the second member of the shift lever wherein the resilient member urges the first member of the shift lever into a neutral position. At least one fastener is provided and releasably secures the first and second members together, wherein the first member is moveable relative to the second member through at least one slot formed in either the first or the second members of the shift lever.

BRIEF DESCRIPTION OF THE DRAWINGS

The above-mentioned and other features and objects of this invention, and the manner of attaining them, will become more apparent and the invention itself will be better understood by reference to the following description of the embodiments of the invention taken in conjunction with the accompanying drawings, wherein:

FIG. 3 is an elevational view partially in section showing the foot pedal shift embodiment of the hydrostatic transmission;

FIG. 4 is a perspective view of the pump and motor block assembly, partially in section, showing the neutral switch and a pair of fluid passageways common to the pump and motor;

FIG. 9 is a plan view of the swash plate and neutral switch of FIG. 4 viewed from the top illustrating the switch in an electrically engaged position and the transmission in a neutral condition;

FIG. 10 is a fragmentary perspective view of the pump and motor block assembly showing the swash plate tilted and the neutral switch in an electrically disengaged position;

FIG. 11 is a plan view of the swash plate and neutral switch of FIG. 10 viewed from the top;

FIG. 12 is an electrical diagram of an ignition circuit showing the neutral switch in an electrically engaged state corresponding to the swash plate and neutral switch arrangement of FIGS. 4 and 9;

FIG. 13 is an electrical diagram of an ignition circuit showing the neutral switch in an electrically disengaged state corresponding to the swash plate and neutral switch arrangement of FIGS. 10 and 11;

FIG. 17 is a perspective view of a pump and motor block assembly, partially in section, illustrating the return to neutral linkage assembly;

FIG. 18 is an exploded view of the return to neutral linkage assembly of FIG. 17;

FIG. 19 is a sectional view of the return to neutral linkage assembly of FIG. 2, a viewed along line 19—19;

FIG. 20 is an elevational view of the return to neutral linkage assembly of FIG. 2, viewed along lines 20—20; and FIG. 21 is a sectional view of the turn to neutral linkage assembly of FIG. 2, viewed along line 21—21.

DETAILED DESCRIPTION OF THE INVENTION

Figure 1:
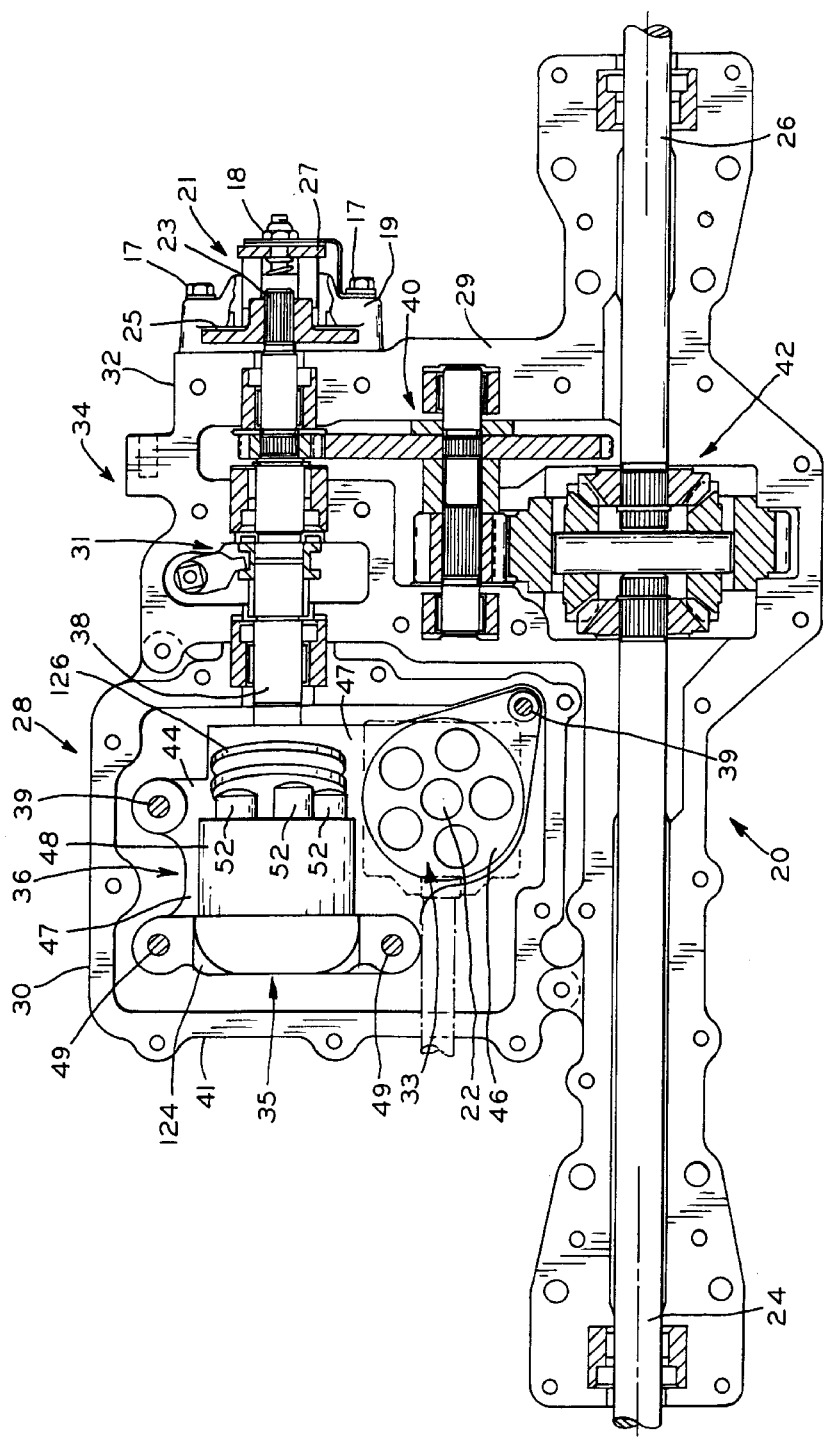
FIG. 1 is a sectional view of a transaxle in accordance with one form of the present invention taken along a horizontal plane intersecting the axes of the axles.

Referring to FIG. 1, transaxle 20 is drivingly engaged with a power source, typically a gasoline powered engine (not shown), whereby transaxle 20 transfers power, generated from the power source, to a pair of respective drive axles 24 and 26 rotatably mounted within axle mechanism module 34. Transaxle 20 includes hydrostatic transmission module 28 removably connected with axle mechanism module 34. Axle mechanism module 34 includes casing 32 which encloses reduction gear train 40 and differential mechanism 42 supported by casing 32. Output shaft 38 extends between hydrostatic transmission casing 30 and axle mechanism casing 32 and includes a mechanical disconnect mechanism 31 of the type disclosed in U.S. Pat. No. 5,701,738 assigned to the assignee of the present application and is expressly incorporated herein by reference. Mechanical disconnect mechanism 31 is provided to disengage axle mechanism module 34 from hydrostatic transmission module 28. As is customary, output shaft 38 is engaged with reduction gear train 40 which, in turn, is engaged with differential mechanism 42 to provide power to drive axles 24 and 26. Hydrostatic transmission module 28 includes pump 33 and motor 35 hydraulically connected through pump and motor block 44. Pump and motor block 44 is fastened to upper casing half 37 of hydrostatic transmission casing 30 by a pair of threaded screws 39 (FIG. 16).

Transaxle 20 includes brake mechanism 21 having distal end 23 of shaft 38 splined to disc 25 which is engaged by a pair of friction pads (not shown) when brake lever 27 is rotated. A cast housing 19 supports the brake mechanism 21 and is mounted to axle casing by a pair of screws 17. Brake mechanism 21 (FIG. 1) employs a self-adjustment feature comprising a self-adjusting nut 18 that accommodates for friction pad wear. The operation of the brake itself is well known and the self-adjustment mechanism is the subject of pending patent application Serial No. 09/165,904, filed Oct. 2, 1998, and assigned to the assignee of the present application. This application is expressly incorporated herein by reference.

Figure 2:
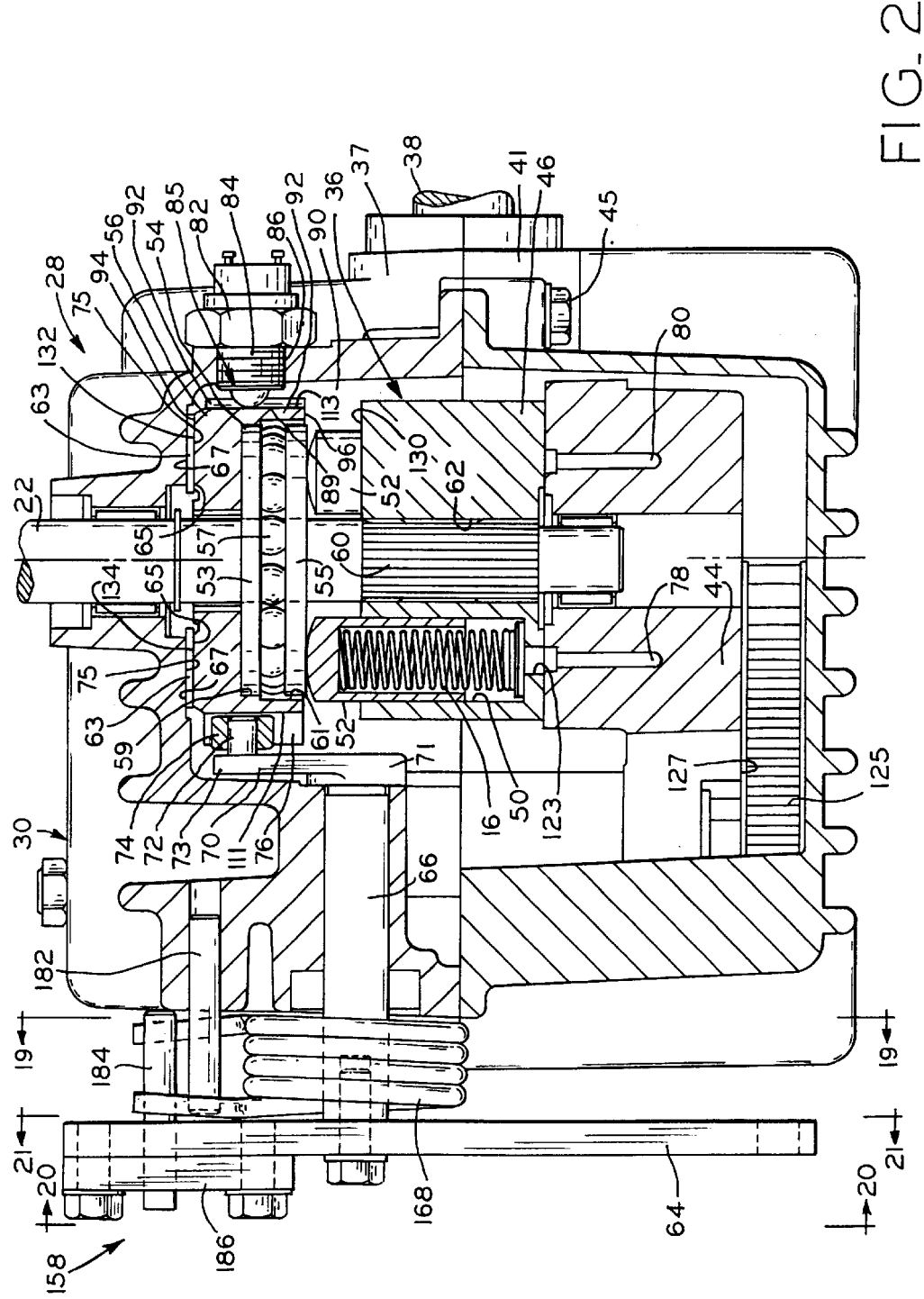
FIG. 2 is a sectional view of the hydrostatic transmission taken along a vertical plane.
Figure 16:
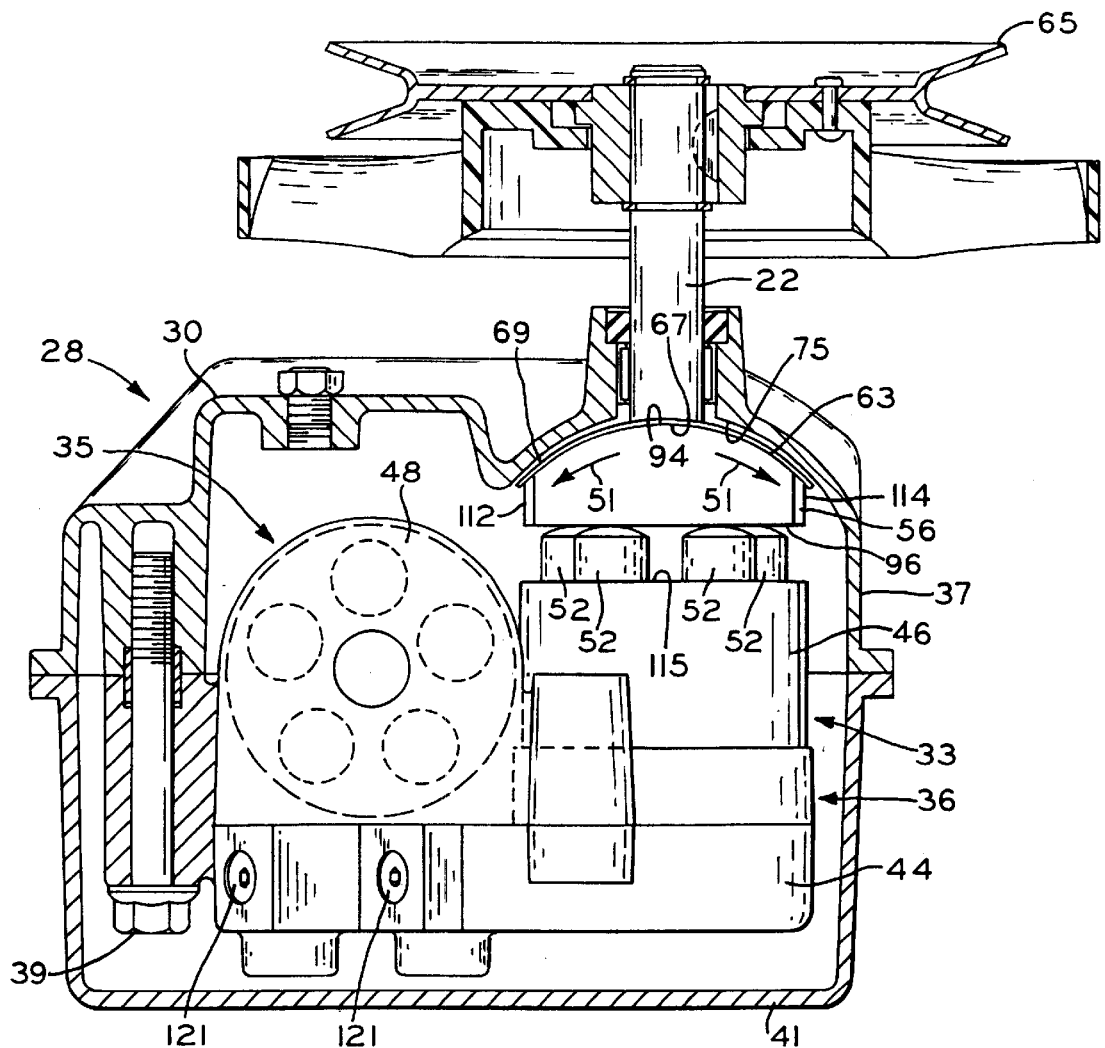
FIG. 16 is a sectional view of the hydrostatic transmission shown in FIG. 1, taken along a vertical plane.

Referring to FIGS. 2, 3 and 16, hydrostatic transmission module 28 includes casing halves 37 and 41 fastened together by screws 45 to form transmission casing 30. Similarly, axle mechanism module 34 includes a pair of casing halves fastened together by a plurality of screws (not shown) to form axle mechanism module 34. One of the casing halves is identified as 29 and is shown in FIG. 1. The structure and operation of the modular transaxle is the subject of pending patent application Ser. No. 09/498,692, filed Feb. 7, 2000, and assigned to the assignee of the present application. This application is incorporated herein by reference.

Referring to FIGS. 2 and 16, hydrostatic transmission module 28 of transaxle 20, includes hydrostatic pump and motor mechanism 36 which provides pump and motor block 44 rotatably supporting pump cylinder barrel 46 and motor cylinder barrel 48 (FIG. 4). Pump cylinder barrel 46 includes a plurality of axially arranged cylinders 50 each having piston 52 disposed therein. Pump cylinder barrel 46 and pistons 52 are common and interchangeable with motor cylinder barrel 48 and respective pistons 52 disposed therein to decrease costs associated with implementing separate components. Springs 16 are provided within each cylinder 50 and contact pistons 52 to provide continuous engagement of pistons 52 with the respective swash plate (FIG. 2).

Figure 15:
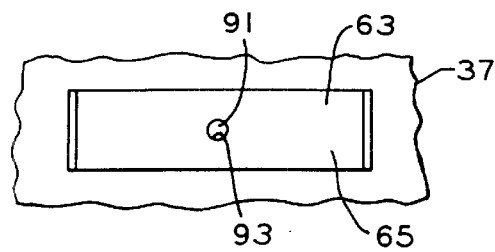
FIG. 15 is a bottom view of the upper half casing of the hydrostatic transmission broken away showing one of the bearing strips.

Swash block or swash plate 56, positioned between pump cylinder barrel 46 and casing half 37 of transmission casing 30, includes arcuate axial surface 94 which engages, and is tiltable within, casing half 37. The path of rotation or tilt of swash plate 56 is illustrated by arrows 51 in FIG. 16. A pair of arcuate low friction bearing strips 63 (FIGS. 14 and 15) are captured within casing half 37 and provide a guide for tilting axial surface 94 of swash plate 56 (FIGS. 2 and 16). Referring to FIGS. 2 and 14–16, each bearing strip 63 includes arcuate concave surface 67, which is engaged with arcuate surface 94 of swash block 56, and an arcuate convex surface 69, which abuts respective arcuate recess 75 (FIGS. 2 and 16) formed in transmission casing half 37. Each recess 75 in casing half 37 includes protrusion 91 which extends within aperture 93 defined in bearing strip 63 (FIG. 15). These bearing strips are the subject of pending patent application Ser. No. 09/498,692, filed Feb. 7, 2000, and assigned to the assignee of the present application. The disclosure of this patent application is expressly incorporated herein by reference. Swash plate 56 includes second lateral surface 96, positioned overlaying and substantially opposite respective of first lateral surface 94. Second lateral surface 96 includes bore 59 and counterbore 61 (FIGS. 2 and 8) therein, which receives thrust bearing 54 (FIG. 2).

Referring to FIG. 2, thrust bearing 54 is axially arranged, respective of pump cylinder barrel 46, and is in contact with ends of pistons 52. Thrust bearing 54 comprises a pair of grooved plates or races 53, 55 which capture therebetween a plurality of ball bearings 57 fitted within grooves formed in plates 53 and 55. Thrust bearing 54 fits snugly within swash plate 56, specifically plate 53 of thrust bearing 54 engages bore 59 of swash plate 56 and plate 55 freely rotates within counterbore 61 (FIG. 2).

In operation, pump cylinder barrel 46 is driven by the power source (not shown) through input shaft 22. Typically, input shaft 22 includes a first end attached to sheave or pulley 65 (FIG. 3 and 16) which is belt driven by the power source. Fan 58 (FIG. 3), included to provide convective cooling to the transmission, and pulley 65 are axially abutted and keyed to shaft 22, as is customary. The other end of input shaft 22 includes splined portion 60 which engages matching splined portion 62 formed within pump cylinder barrel 46 (FIG. 2). Referring to FIGS. 4 and 10, swash plate 56, is manually or selectively controlled by shift lever 64 located externally to transmission casing 30. Movement of shift lever 64 causes swash plate 56 to tilt which initiates fluid displacement within pump cylinder barrel 46. The fluid displaced by pump 33 hydraulically connects motor 35 through a pair of arcuate passageways 78 and 80 formed within pump and motor block 44. Motor cylinder barrel 48 comprises outwardly thrusting pistons 52 which contact an inclined and fixed swash plate 126 causing rotation of the motor cylinder barrel 48 (FIGS. 1, 4 and 10). Motor cylinder barrel's 48 rotation is transferred to rotation of drive axles 24 and 26 through reduction gear train 40 and differential mechanism 42.

Referring to FIG. 2, the shift assembly will be described. A two-part shift lever includes shift lever 64 and adjustable member 186 and shift lever 64 is attached to rotatable control rod 66 (FIG. 2) by screw 68, external to casing 30 (FIG. 3). Control arm 70 includes first end 71 attaching to control rod 66 and a second end 73 extending outwardly and generally perpendicular from control rod 66. Second end 73 of control arm 70 pivots respective of control rod 66 when control rod 66 is rotated. Pin 72 attaches to second end 73 of control arm 70 and extends into slot 76 disposed on periphery 77 of swash plate 56. Friction roller 74 fits over pin 72 and freely rotates about pin 72 to engage with slot 76 of swash plate 56. Selectively positioning control lever 64, for example, by an operator depressing a foot pedal or fender control lever linked thereto by way of linkage, causes swash plate 56 to tilt, and in turn, pistons 52, orbiting about input shaft 22, reciprocate thereby causing fluid to become pressurized within cylinder 50 by reciprocating pistons 52. Notably, switch 82 is threadably connected to transmission casing 30 and includes registering portion 85 extending internally within interior 90 of transmission casing 30 to prevent non-neutral startup as described below (FIG. 2).

Figure 5:
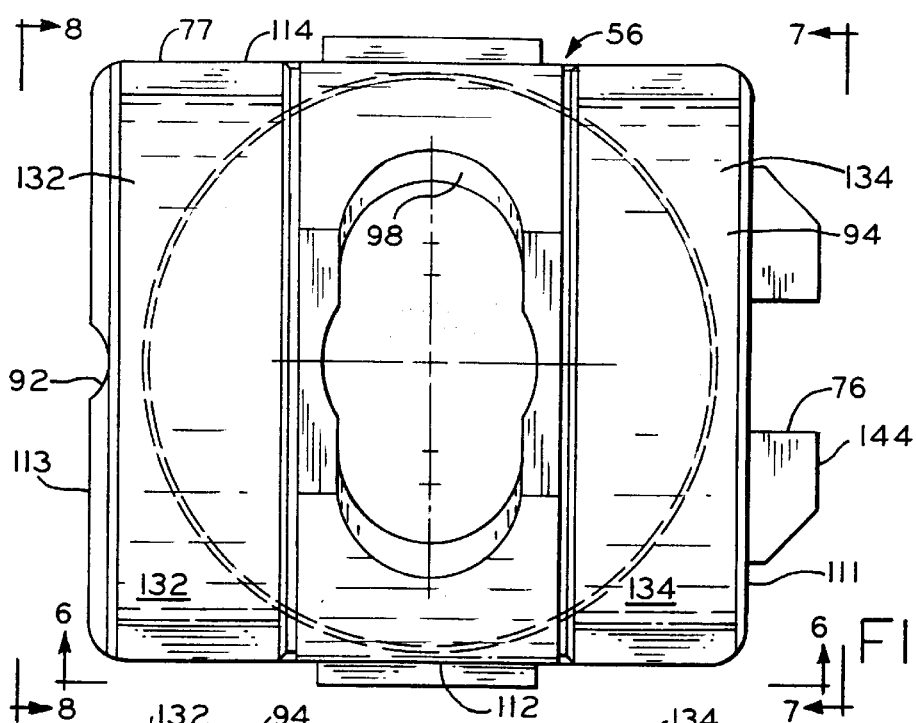
FIG. 5 is a plan view of the swash plate.
Figure 6:
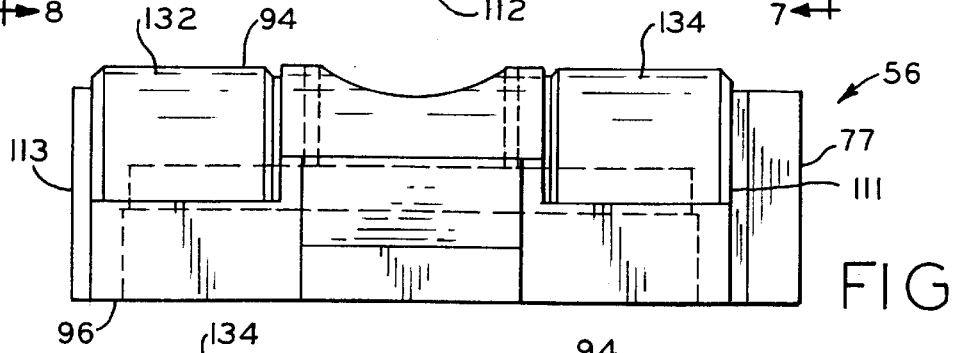
FIG. 6 is a front elevational view of the swash plate of FIG. 5, viewed along line 6—6.
Figure 7:
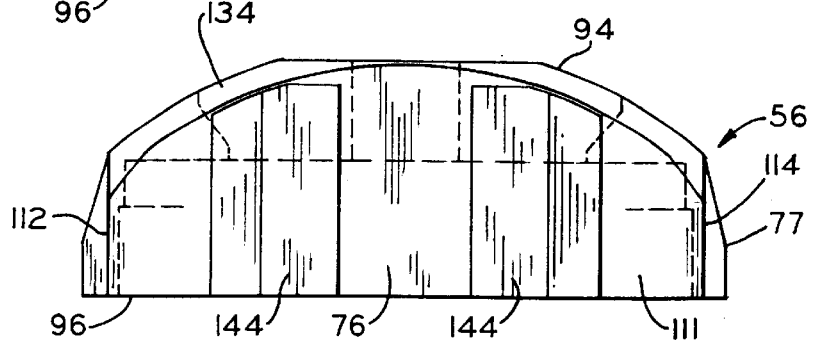
FIG. 7 is an end view of the swash plate of FIG. 5, viewed along line 7—7.
Figure 8:
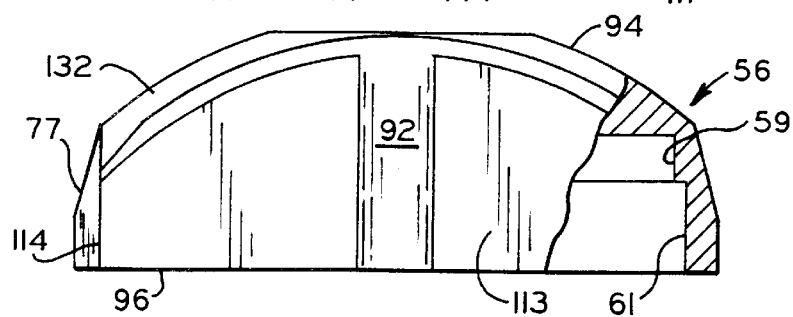
FIG. 8 is a partially fragmented end view of the swash plate of FIG. 5, viewed along line 8—8.

Switch 82 is a conventional limit-type switch and includes threaded housing portion 84 engaged with threaded portion 86 of casing 30 and registering portion 85 which includes ball or roller 89 retractably engaged with swash plate 56. As shown in FIG. 2, roller 89 is disposed on an outermost extent of portion 84 of switch 82 and in direct engagement with a surface discontinuity such as groove 92 formed in swash plate 56 (FIG. 8). Groove 92, formed in periphery 77 of swash plate 56, extends from first lateral surface 94 of swash plate 56 to second lateral surface 96 of swash plate 56 (FIGS. 2 and 8). Groove 92 is located on periphery 77 of swash plate 56 and has a generally semi-circular cross-section 100 (FIGS. 5, 10 and 11). As best seen in FIGS. 4 and 10, swash plate 56 has an oval slot 98, positioned generally centered respective of first lateral surface 94 of swash plate 56, which receives input shaft 22, extended through oval slot 98. As best seen in FIG. 4, first lateral surface 94 of swash plate 56 is arcuate and overlays second lateral surface 96 of swash plate 56. Located opposite groove 92 is slot 76 (FIG. 7) having a substantially rectangular cross-section 110 which receives the shift lever linkage. As best seen in FIG. 5, swash plate 56 is generally rectangular and its periphery 77 includes a pair of respective end faces 112, 114 and a pair of respective side faces 111, 113.

Figure 14:
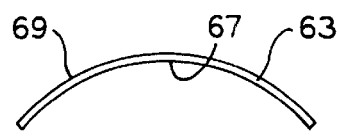
FIG. 14 is an end elevation of one of the bearing strips.

Referring to FIGS. 4 and 10, rotation of control rod 66 through, for example, user displacement of shift lever 64, causes arcuate lateral surface 94 of swash plate 56 to rotate, guided by contact between lateral surface 94 and bearing strips 63 (FIG. 16). Lateral surface 94 of swash plate 56 includes a pair of arcuate surfaces 132 and 134 (FIGS. 5–8) which are engaged with respective arcuate surfaces 65 of bearing strips 63 respectively, (FIGS. 14 and 15). Bearing strips 63 may be formed, for example, from a DELRIN and TEFLON composite, comprising about 20% TEFLON. Alternatively, bearing strips 63 may be manufactured from a like material which exhibits suitable durability and low friction characteristics. Referring to FIG. 16, end faces 112, 114 of periphery 77 of swash plate 56 rock or tilt, respective of face 115 of pump cylinder barrel 46, illustrated by arrows 51, to produce fluid displacement of pump 33. In contrast, movement of side faces 111 and 113 (FIG. 4–6 and 9–11) of periphery 77 may be best described as rotation in a single plane substantially perpendicular to face 115 of pump cylinder barrel 46 (FIG. 2).

Referring to FIGS. 1 and 4, pump and motor block 44 is a two piece assembly which includes pump block 47 and motor block 124 fastened together by a pair of screws 49 which thread into upper half 37 of casing 30 (FIG. 16). The two piece pump and motor block is the subject of pending patent application Ser. No. 09/498,666 filed Feb. 7, 2000, and assigned to the assignee of the present application. The disclosure of this application is expressly incorporated herein by reference. Referring to FIG. 4, pump and motor block 44 provide a pair of arcuate pump openings 116 and 118 in fluid communication with arcuate motor openings 120 and 122, respectively, through respective passageways 78, 80. Passageways 78 and 80 are formed in pump and motor block 44, and comprise two continuous and separate passageways fluidly connecting pump 33 to the motor 35. Referring to FIG. 2, hydraulic fluid accumulates within casing half 41 which is drawn in through filter 125 and enters lower portion 127 of pump and motor block 44 through ports (not shown). The ports are fluidly connected to respective passageways 78 and 80.

Referring to FIG. 4, passageway 78, of pump and motor block 44, includes passageway 117 formed in pump block 47 mating with passageway 79 formed in motor block 124. Similarly, passageway 80, includes passageway 119 formed in pump block 47 mating with passageway 81 formed in motor block 124. Passageways 117 and 119 in pump block may be machined by drilling cross holes and thereafter providing plugs 121 to close the drilled hole entrances (FIG. 16). However, passageways 117 and 119 may also be formed by providing foam cores during the casting process to eliminate additional machining and plugging of the pump block 47. Passageways 79 and 81 in motor block 124 (FIG. 4) may be formed contemporaneously with motor block 124 through, for example, a powder metal manufacturing process.

Continuous passageways 78 and 80, in pump and motor block 44, are in hydraulic communication with pump cylinder barrel 46 through arcuate openings 116 and 118, respectively. Similarly, passageways 78 and 80 are in hydraulic communication with motor cylinder barrel 48 through respective arcuate openings 120 and 122 formed in motor block 124. Arcuate pump openings 116, 118, and additionally, arcuate motor openings 120, 122, are machined to provide a suitably precise tolerance of corresponding opening to respective orifice 123 (FIG. 2) within pump cylinder barrel 46 and motor cylinder barrel 48.

Referring to FIGS. 2–4 and 16, swash plate 56 is illustrated in a "neutral position" respective of face 115 of pump cylinder barrel 46. The neutral position corresponds to pistons 52 within pump cylinder barrel 46 being substantially equally extended, so as not to cause reciprocation thereof. The neutral position coincides with an insignificant fluid displacement of pump 33. It may be seen that plate 55 of thrust bearing 54 is substantially coplanar with face 115 of pump cylinder barrel 46 when pump and motor mechanism 36 is in the neutral position (FIGS. 2 and 16). Neutral switch 82 is electrically engaged so that an operator may energize the power source without concern of activating an engaged transmission. Referring to FIG. 12, shown is a typical ignition circuit 150 corresponding to hydrostatic pump and motor mechanism 36 in the neutral position as shown in FIGS. 4 and 9. Ignition circuit 150 includes normally closed switch 82 electrically connected to starter 152, ignition switch 154 and battery 156. Typically, an operator activates or closes switch 154 by turning an ignition key (not shown) which provides power, via battery 156 to starter 152, to start power source (not shown), such as a combustion engine.

Referring to FIGS. 4 and 9, registering portion 85 of switch 82, positioned internally relative to hydrostatic transmission housing (FIG. 2), includes semi-spherical roller 89 which extends into groove 92 provided on side face 113 of periphery 77 of swash plate 56 to close switch 82. It is envisioned that the extending portion of the switch may contact groove 92, or alternatively, a gap may exist between roller 89 and groove 92 to provide equally suitable electrical connection of switch 82.

Referring to FIGS. 10 and 11, hydrostatic pump and motor mechanism 36 is shown in an "engaged position" corresponding to a significant displacement of fluid from pump cylinder barrel 46 to motor cylinder barrel 48. As best shown in FIG. 10, swash plate 56 is tilted, respective of face 46 of pump cylinder 46, which sequentially forces each piston 52 to reciprocate as pump cylinder barrel 46 rotates. Plate 55 of thrust bearing 54 is at an angle respective of face 115 of pump cylinder barrel 46. Neutral switch 82 is electrically disconnected (FIG. 13), thus an operator is prevented from activating the power source. Neutral switch 82 is engaged with side face 113 of periphery 77 of swash plate 56 and roller 89 is displaced or retracted into housing portion 84 of switch 82. End face 112 of periphery 77 of swash plate 56 is tilted toward face 115 of pump cylinder barrel 46 and pistons 52 are urged to reciprocate within their respective cylinder 50 as pump cylinder barrel 46 rotates, driven by input shaft 22. Correspondingly, roller 89 of switch 82 is retracted into a body of switch 82 which provides an electrical deactivation or "open" switch 82 (FIG. 13). Swash plate 56, tilted in either direction 51 (FIG. 16), results in roller 89 traversing groove 92 to deactivate switch 82.

Referring to FIG. 13, shown is ignition circuit 150, which corresponds to hydrostatic pump and motor mechanism 36 in an engaged position as shown in FIGS. 10 and 11 and switch 82 is mechanically engaged with side face 113 of periphery 77 of swash plate 56, corresponding to a significant displacement of fluid from pump 33 to motor 35. Thus, switch 82 is disengaged and activation of ignition switch 154, by itself, will not provide power via battery 156, to starter 152.

Referring to FIGS. 2, 17, and 18, neutral adjustment assembly 158 will now be described. Shift lever 64 is attached to rotatable control rod 66 and includes a square aperture 160 which corresponds to, and is engaged with, square portion 162 formed on an end of control rod 66. Threaded fastener 68 is threaded into control rod 66 which rigidly attaches shift lever 64 to control rod 66 (FIGS. 3 and 18). Spacer 166 is provided with clearance hole 170 and outer surface 172 of control rod 66 is extended through hole 170 of spacer 166. Torsion spring 168 is substantially concentrically positioned relative to spacer 166, restrained by outer surface 176 of spacer 166. Torsion spring 168 is provided with a pair of outwardly extended and substantially parallel legs 178 and 180. First and second legs 178 and 180 of torsion spring 168 are in continuous engagement with a pair of posts. First post 182 extends from casing 30 and post 184 extends inwardly toward casing and is rigidly fastened to second member 186 of the two-piece shift lever. In the exemplary embodiment, second member 186 of the two-piece shift lever consists of an adjustable plate.

As best seen in FIGS. 2 and 19, post 184 is positioned above post 182, however it will be understood that post 184 is rotatable, rotating respectively with shift lever 64 while post 182 remains fixed with casing 30 and extends through large through hole 185. Adjustable plate 186 fastens to shift lever 64 by means of a pair of threaded fasteners 188 and 189 which respectively engage holes 190 and 192 of shift lever 64 (FIG. 19). Unlike clearance hole 193 in second member or adjustable plate 186, slot 194 in adjustable plate 186 facilitates positional rotation of shift lever 64 relative to adjustable plate 186, which is best seen in FIGS. 20 and 21.

Slot 194 is defined by slot wall 191 which includes a pair of arcuate stops 195, 197 (FIG. 18). Stops 195, 197 limit the adjustability of neutral adjustment assembly 158, i.e., rotation of shift lever 64 relative to adjustable plate 186. Located at a lowermost portion-of shift lever 64 is through hole 196, which receives foot pedal linkage (not shown) such as, for example, cable linkage.

In operation, as an operator rotates shift lever 64, via a foot pedal (not shown) or other control typically known to those having ordinary skill in the art. In turn, shift lever 64 is thereby rotated, for example, in a first direction as indicated by arrow 202 (FIGS. 17 and 19). In this first position, post 184, extending from adjustable plate 186, rotates relative to control rod 66 and is in continuous contact with inner portion 198 of second spring leg 180 (FIG. 19). It may be seen that, while inner portion 198 of leg 180 is in continuous and rotating contact with pin 184, inner portion 200 of second leg 178 is in stationary and in continuous contact with post 182.

Conversely, operator movement of shift lever 64, for example, via pedal depression as was previously mentioned in a second direction (e.g., reverse) as indicated by arrow 204, is now described. First leg 178 of torsion spring 168 is caused to rotate, rather than second leg 180 of torsion spring 168, as previously described relative to movement of shift lever 64 as indicated by arrow 202. Specifically, when an operator rotates shift lever 64 as indicated by arrow 204, post 184 is in continuous contact with inner portion 200 of leg 178 and rotates relative to control rod 66. Second leg 180 of torsion spring 168 is in stationary and in continuous contact with post 182, extended from casing 30. Since first and second legs 178 and 180 of spring 168 rotate relative to each other, an oppositional force is developed which counters motion of the moving leg to thereby return shift lever to a neutral position. This general type of spring return action for neutral holding has been used for a number of years on hydrostatic transmissions.

Neutral adjustment mechanism 158 of the present invention includes shift lever 64 and adjustable plate 186. Shift lever 64, as best seen in FIG. 20 and corresponding to rotation direction 204, is rotatable relative to adjustable plate 186 at a maximum angle from the vertical 195, which is, for example, 2.344°. Additionally, shift lever 64 may be rotatably adjusted in direction indicated by arrow 202, an additional 2.344° (not shown). Therefore, shift lever 64 includes a range of rotational adjustability which spans 4.688°.

In operation, shift lever 64 pivots about threaded fastener 188 and slot 194 in adjustable plate 186 accommodates for rotation of shift lever 64 relative to adjustable plate 186. Through hole 185 in shift lever 64 also accommodates for the shift lever's positional rotation relative to adjustable plate 186 and specifically the positioning of post 184 extending through hole 185 of shift lever 64. It will be understood by those having ordinary skill in the art that when fine adjustment of the hydrostatic transmission assembly is warranted, to obtain a neutral position therefor, threaded fastener 188 and 189 are loosened enough that shift lever 64 is rotatable relative to adjustable plate 186. Thereafter, a neutral position for shift lever 64 is located and threaded fasteners 188 and 189 are tightened to rigidly affix adjustable plate 186 to shift lever 64.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydrostatic transaxle assembly drivingly connected to a power source, the power source electrically started through an electric starter circuit, the hydrostatic transaxle comprising:

a casing;

a hydrostatic transmission comprising a variable displacement pump supported by said casing and driven by the power source, said pump including a pump cylinder barrel containing a plurality of parallel, axially oriented cylinders each including a reciprocable piston therein;

a swash plate positioned between said pistons and said casing and including a lateral surface tiltably supported by said casing; and a neutral switch having a portion fixed relative to said casing and a registering portion internally positioned within said casing, said registering portion of said switch in direct engagement with a surface discontinuity on said lateral surface of said swash plate whereby swash plate movement causing pump displacement electrically deactivates the starter circuit.

2. The hydrostatic transaxle assembly of claim 1, further comprising a hydrostatic motor fluidly connected to said pump, said motor having an axis of rotation 90° respective of an axis of rotation of said pump.

3. The hydrostatic transaxle assembly of claim 1, wherein said surface discontinuity includes a groove therein which cooperates with said registering portion of said switch in neutral position.

4. The hydrostatic transaxle assembly of claim 3, wherein the starter circuit comprises said neutral switch, a starter, a battery and a starter switch, said starter switch in series with said neutral switch whereby when said registering portion of said neutral switch is disposed in said groove of said swash plate, said neutral switch is electrically activated.

5. The hydrostatic transaxle assembly of claim 3, wherein a side face opposite of said lateral surface of said swash plate includes a slot disposed therein in engagement with a shift lever linkage.

6. The hydrostatic transaxle assembly of claim 1, wherein said registering portion of said switch includes a retractable roller disposed in an extending portion.

7. The hydrostatic transaxle assembly of claim 1, further comprising a thrust bearing fixed within said swash plate and engaged with said pistons.

8. The hydrostatic transaxle assembly of claim 1, further comprising at least one bearing strip disposed in a recess in said casing and slidably engaged with said swash plate.

9. A hydrostatic transaxle assembly drivingly connected to a power source, the power source electrically started through an electric starter circuit, the hydrostatic transaxle comprising:

a casing;

a pump and motor block disposed within said casing;

a variable displacement pump rotatably supported by said pump and motor block, said pump including a plurality of substantially parallel, axially arranged cylinders each having a reciprocable piston disposed therein, said pistons retractably extending from said pump;

a motor in fluid communication with said pump through said pump and motor block;

at least one passageway disposed in said pump and motor block to provide fluid communication between said pump and motor;

a swash plate overlaying said plurality of pistons, said swash plate rotatably supported internally within said casing; and neutral switch means in direct engagement with said swash plate for causing electrical deactivation of said starter circuit upon movement of said swash plate to a position corresponding to fluid displacement from said pump.

10. The hydrostatic transaxle of claim 9, wherein said neutral switch means includes a neutral start switch fixed respective to said casing and electrically connected to the starter circuit, said switch including a registering portion disposed within said casing and in engagement with said swash plate.

11. The hydrostatic transaxle of claim 10, wherein said registering portion of said neutral start switch includes a retractable roller disposed in an extending portion, said roller in engagement with a periphery of said swash plate.

12. The hydrostatic transaxle of claim 11, wherein said swash plate includes a slot disposed on said periphery, said slot slidingly receives a control arm, said control arm in communication with a shift lever.

13. The hydrostatic transaxle of claim 9, wherein said neutral switch means includes a switch housing threadably received by said casing and said registering portion of said switch extends through a wall of said casing.

* * * * *

UNITED STATES PATENT AND TRADEMARK OFFICE
CERTIFICATE OF CORRECTION

PATENT NO.    : 6,378,300 B1
DATED         : April 30, 2002
INVENTOR(S)   : Kevin L. Johnson et al.

It is certified that error appears in the above-identified patent and that said Letters Patent is hereby corrected as shown below:

<u>Title page,</u>
Item [75], the first inventor's name should be -- Kevin L. Johnson --

<u>Column 10,</u>
Line 50, delete "opposite of said lateral surface" and insert after the word "plate" -- opposite of said lateral surface --

Signed and Sealed this

Fifteenth Day of October, 2002

Attest:

Attesting Officer

JAMES E. ROGAN
Director of the United States Patent and Trademark Office